US011729625B2

(12) United States Patent
Stewart

(10) Patent No.: US 11,729,625 B2
(45) Date of Patent: Aug. 15, 2023

(54) ASSOCIATING A USER SERVICE WITH A TELEPHONY IDENTIFIER

(71) Applicant: Metaswitch Networks Ltd., Enfield (GB)

(72) Inventor: Mark Stewart, Cambridge (GB)

(73) Assignee: Metaswitch Networks Ltd., Enfield (GB)

( * ) Notice: Subject to any disclaimer, the term of this patent is extended or adjusted under 35 U.S.C. 154(b) by 0 days.

(21) Appl. No.: 17/094,478

(22) Filed: Nov. 10, 2020

(65) Prior Publication Data

US 2022/0030422 A1 Jan. 27, 2022

(30) Foreign Application Priority Data

Jul. 24, 2020 (GB) ..................................... 2011545

(51) Int. Cl.
*H04W 12/61* (2021.01)
*H04W 4/14* (2009.01)
*H04W 12/08* (2021.01)

(52) U.S. Cl.
CPC .............. *H04W 12/61* (2021.01); *H04W 4/14* (2013.01); *H04W 12/08* (2013.01)

(58) Field of Classification Search
CPC ....... H04W 12/08; H04W 12/61; H04W 4/14; H04W 12/00; H04W 60/00; H04W 8/20; H04W 12/06; H04W 4/16
See application file for complete search history.

(56) References Cited

U.S. PATENT DOCUMENTS 10,893,414 B1 * 1/2021 Filart .................. H04L 65/1069
10,943,005 B2 * 3/2021 Chen ..................... H04W 12/40
(Continued)

FOREIGN PATENT DOCUMENTS

EP 2387219 A1 11/2011
GB 2547231 A * 8/2017 ............. H04L 63/08
(Continued)

OTHER PUBLICATIONS

Combined Search and Examination Report dated Aug. 5, 2020 for GB Application No. GB2011545.7.
(Continued)

*Primary Examiner* — Khawar Iqbal
(74) *Attorney, Agent, or Firm* — Han Gim; Newport IP, LLC

(57) ABSTRACT

Associating a user service with a telephony identifier. The user service is accessible by a user of a telephony device via an application on the telephony device. The telephony device is operable in a radio telephony network (RTN) and is contactable via the telephony identifier when operating in the RTN. Network equipment: communicates, between the network equipment and the application on the telephony device, first data comprising a communicated token; receives, from the telephony device, second data comprising a received token, wherein the second data is received from the telephony device via an RTN-native service; receives, from a network node in the RTN, the telephony identifier in control signalling associated with the RTN-native service; and based at least on correlating the received token with the communicated token, associates the received telephony identifier with the user service.

17 Claims, 4 Drawing Sheets

(56) References Cited

U.S. PATENT DOCUMENTS

| | | | | |
|---|---|---|---|---|
| 11,395,132 | B2* | 7/2022 | Lee | H04W 12/72 |
| 2007/0249375 | A1 | 10/2007 | Zapata et al. | |
| 2015/0119090 | A1* | 4/2015 | Chuang | H04W 4/14 |
| | | | | 455/466 |
| 2016/0127902 | A1* | 5/2016 | Ciarniello | G06F 21/43 |
| | | | | 380/247 |
| 2018/0352417 | A1* | 12/2018 | Butler | H04W 8/10 |
| 2019/0082323 | A1* | 3/2019 | Pitti | H04L 63/101 |
| 2020/0374667 | A1* | 11/2020 | Gehani | H04M 7/0033 |
| 2020/0389775 | A1* | 12/2020 | Ravichandran | H04W 4/60 |
| 2021/0150498 | A1* | 5/2021 | Fukuizumi | G06Q 20/04 |
| 2021/0235235 | A1* | 7/2021 | Goldenstein | H04W 4/14 |
| 2021/0282012 | A1* | 9/2021 | Lee | H04L 9/3213 |
| 2021/0294880 | A1* | 9/2021 | Polychronidis | G06F 21/32 |
| 2022/0132315 | A1* | 4/2022 | Kolekar | H04L 63/205 |
| 2022/0150813 | A1* | 5/2022 | Caceres | H04W 12/088 |
| 2023/0007001 | A1* | 1/2023 | Modi | H04L 63/0884 |

FOREIGN PATENT DOCUMENTS

| | | | | |
|---|---|---|---|---|
| GB | 2547231 | A | 8/2017 | |
| GB | 2547231 | * | 2/2021 | H04W 12/06 |

OTHER PUBLICATIONS

International Search Report and Written Opinion Issued in PCT Application No. PCT/EP21/070713, dated Oct. 22, 2021, 12 Pages.
"Notice of Allowance Issued in United Kingdom Patent Application No. 2011545.7", dated May 25, 2022, 2 Pages.

* cited by examiner

US 11,729,625 B2

ASSOCIATING A USER SERVICE WITH A TELEPHONY IDENTIFIER

CROSS-REFERENCE TO RELATED APPLICATIONS

This application claims priority to GB Application No. GB2011545.7, filed Jul. 24, 2020, under 35 U.S.C. § 119(a). The above-referenced patent application is incorporated by reference in its entirety.

BACKGROUND OF THE INVENTION

Technical Field

The present disclosure relates to associating a user service with a telephony identifier.

Description of the Related Technology

First-generation Unified Communications (UC) solutions, which solely rely upon over-the-top (OTT) voice, are seeing limited market adoption on mobile devices owing to unreliable voice quality and difficulties with users managing multiple applications. Newer UC solutions more tightly integrate with radio telephony network (RTN)-native voice services, wherein an RTN is a network that uses radio technology to provide telephony services to network users. For example, a standard RTN-native voice call, made using a native dialler application on a mobile device, can be augmented (also referred to as "enhanced") with additional call functions. However, user onboarding, where a user is enabled to access UC solutions as part of a user service, can involve significant amounts of manual work and can be resource-intensive, complicated and error-prone.

SUMMARY

According to first embodiments, there is provided a method of associating a user service, which is accessible by a user of a telephony device via an application on the telephony device, with a telephony identifier, the telephony device being operable in a radio telephony network, RTN, and being contactable via the telephony identifier when operating in the RTN, the method being performed by network equipment and comprising:
  communicating, between the network equipment and the application on the telephony device, first data comprising a communicated token;
  receiving, from the telephony device, second data comprising a received token, wherein the second data is received from the telephony device via an RTN-native service;
  receiving, from a network node in the RTN, the telephony identifier in control signalling associated with the RTN-native service; and
  based at least on correlating the received token with the communicated token, associating the received telephony identifier with the user service.

According to second embodiments, there is provided network equipment configured to perform a method according to the first embodiments.

According to third embodiments, there is provided a method of enabling a user service, which is accessible by a user of a telephony device via an application on the telephony device, to be associated with a telephony identifier, the telephony device being operable in a radio telephony network, RTN, and being contactable via the telephony identifier when operating in the RTN, the method being performed by the telephony device and comprising:
  communicating, between telephony network equipment in the RTN and the application on the telephony device, first data comprising a token;
  transmitting, by the telephony device, second data comprising the token, wherein the second data is transmitted from the telephony device via an RTN-native service.

According to fourth embodiments, there is provided a telephony device configured to perform a method according to the third embodiments.

According to fifth embodiments, there is provided a computer program configured to perform a method according to the first or third embodiments.

According to sixth embodiments, there is provided a network comprising network equipment according to the second embodiments and a telephony device according to the fourth embodiments.

Further features and advantages will become apparent from the following description, given by way of example only, which is made with reference to the accompanying drawings.

DETAILED DESCRIPTION OF CERTAIN INVENTIVE EMBODIMENTS

Figure 1:
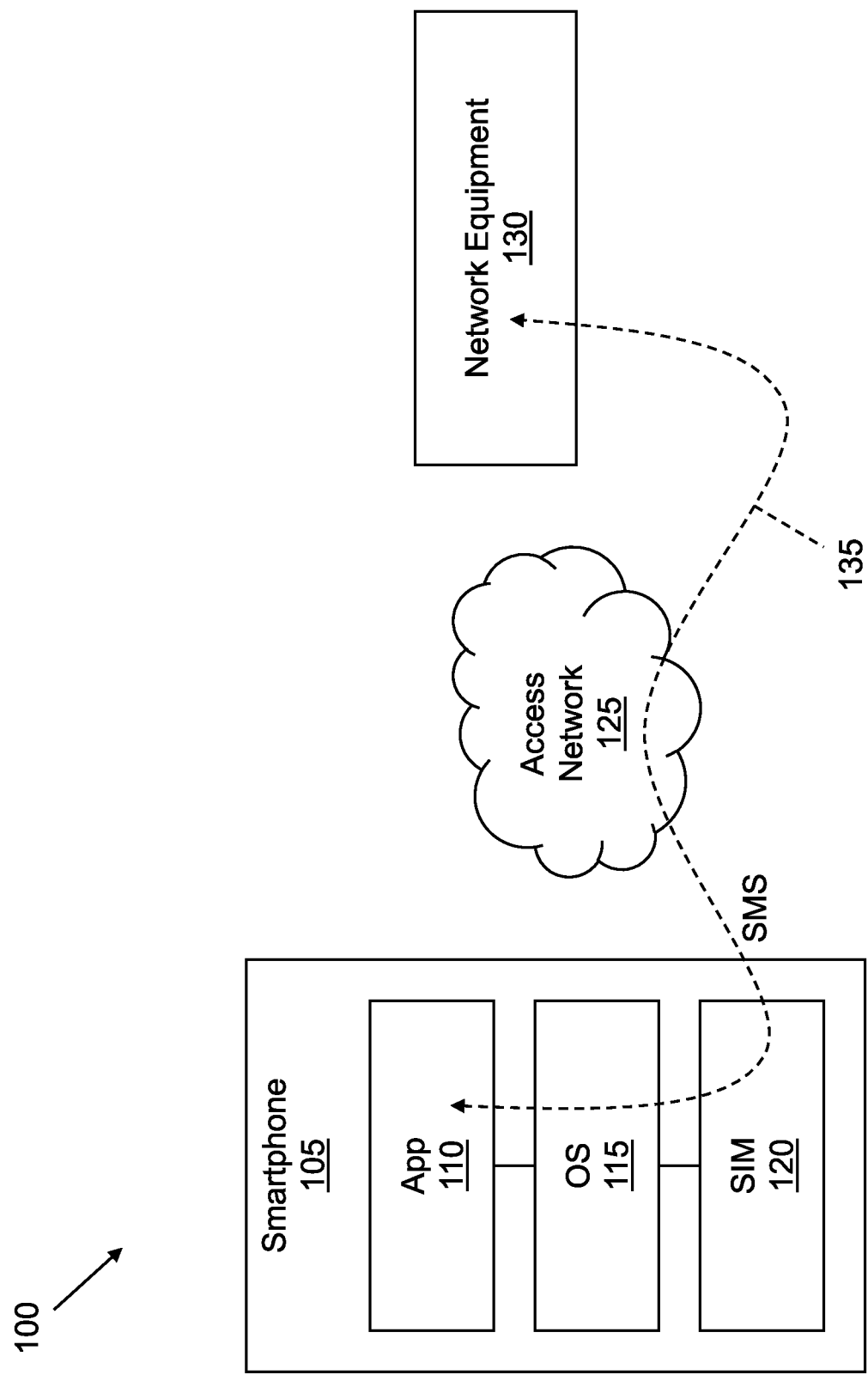
FIG. 1 shows a schematic block diagram representing an example of a network.

Referring to FIG. 1, there is shown an example of a network 100. In this example, the network 100 comprises an RTN. The RTN 100 may comprise a mobile network, a cellular network, etc. RTN UC services may be provided as part of a user service in the network 100.

Various entities are depicted in the network 100. At least some such entities may comprise, or may be implemented using, one or more processors and one or more memories. One or more computer programs comprising computer-readable instructions may be stored in the one or more memories. The one or more processors may be configured to execute the computer-readable instructions and perform at least some of the methods and techniques described herein as result.

The network 100 comprises a telephony device 105, via which telephony can be conducted in the network 100. In this example, the telephony device 105 is a mobile telephony device in the form of a smartphone. However, the telephony device 105 can take other forms in other examples. For example, the telephony device 105 may be another type of mobile telephony device, such as a tablet computing device, laptop computing device, wearable computing device etc. The telephony device 105 comprises an application 110, an operating system (OS) 115 and a subscriber identification component 120. The OS 115 may be a mobile operating system, examples of which include, but are not limited to, Android and iOS.

The subscriber identification component 120 may be a hardware- and/or software-based component. In examples described below, the subscriber identification component 120 generally comprises a subscriber identity module (SIM) card, which may also be known as a Universal Integrated Circuit Card (UICC), and will generally be referred to as a "SIM". The subscriber identification component 120 can, however, take other forms, examples of which include, but are not limited to, Universal SIMs (USIMs), iSIMs and eSIMs.

The SIM 120 stores an identity, such as an International Mobile Subscriber Identity (IMSI), which is unique to the SIM 120 and does not change over time. The type of unique identity stored in the SIM 120 depends upon, for example, the type of network 100. For example, the unique identity may be an IMS Private User Identity (IMPI) in a Voice over Long-Term Evolution (VoLTE) network.

The SIM 120 is also associated with one or more telephony identifiers via which the telephony device 105 is contactable in the network 100. One example of such a telephony identifier is a Mobile Subscriber ISDN Number (MSISDN), which may also be referred to as a "Mobile Station International ISDN Number" or a "Mobile International ISDN Number". The association of an MSISDN with a SIM can change over time. Telephony identifiers can, however, take different forms in other examples. For example, in a VoLTE network, the telephony identifier may comprise an IMS Public User Identity (IMPU), which can take the form of a TEL or Session Initiation Protocol (SIP) Uniform Resource Identifier (URI). The SIM 120 may be associated with multiple IMPUs, for example. The telephony identifier may be given out by the user for other users to contact them and may be thought of as the telephone number of the device 105. However, the telephony identifier is not limited to being a number.

The network 100 comprises an access network 125. In this example, the access network 125 comprises a radio access network (RAN).

The network 100 also comprises network equipment 130. In this example, the network equipment 130 comprises one or more servers.

The application 110 can cause a short message service (SMS) message to be transmitted to the network equipment 130 via a first path (also referred to as a "communication channel") 135 through the network 100, as represented by a dashed line in FIG. 1.

For some UC call functions to operate, the application 110 and/or accompanying network-side software run by the network equipment 130 needs to know the MSISDN associated with the SIM 120 inserted into the device 105 running the application 110 (and similarly need to know other types of telephony identifier where the telephony identifier takes a different form). Examples of such UC call functions include, but are not limited to, uplifting an RTN-native voice call into a collaborative meeting session, moving an RTN-native voice call between different devices of a multi-device user, and off-net calling. An RTN-native voice call can be made using a native dialler application on the device 105. However, the SIM 120 may be provided by the same service provider as, or a different service provider from, a service provider providing the UC services. For example, the SIM 120 may be provided by a mobile network operator and the UC services may be provided by a different service provider. In addition, a user might have multiple devices (such as multiple different telephony devices), each with different SIMs. This may be as part of a multi-device service.

In examples that will now be described, the telephony identifier via which the device 105 is contactable in the network 100 comprises an MSISDN associated with the SIM 120. However, the telephony identifier can be different in other examples.

The network-side software could, in principle, learn the MSISDN associated with the SIM 120 by the application 110 prompting the user to enter the MSISDN into the application 110, and the application 110 passing the entered MSISDN to the network equipment 130. This assumes that the user knows the MSISDN such that they can enter it into the application 110. This can be effective where, for example, the device 105 is a personal device belonging to the user, which they use to make and receive personal calls and where the user is likely to know their own MSISDN. In such cases, the network-side software may use the MSISDN solely as a convenient, globally unique identifier for OTT communications (for example, OTT voice calls) with the device 105. The network-side software may not, for example, subsequently use the MSISDN to route or otherwise handle RTN-native voice calls involving the device 105.

However, there are other scenarios in which it is not straightforward for the user to know or discover the MSISDN.

One such scenario is where the user has a multi-device, 'one-number' service. To overcome technical limitations in some existing RTNs, each SIM in each of the multiple devices is associated with a unique MSISDN. Attempts are often made to hide the unique MSISDNs from the user. For example, the one-number service can override the caller ID for an outgoing call such that the unique MSISDN associated with the device from which the outgoing call is made is not used as the caller ID.

Another such scenario is where the SIM 120 is provided by an employer of the user, to be used for business calls. Even if the SIM 120 was originally supplied as a credit-card sized unit with identifying information printed on the unit, a physical SIM card (for example a Micro SIM or Nano SIM) which is inserted into the device 105 is much smaller than the unit, and too small to fit printed information on. As such, the identifying information can easily get lost and/or forgotten. For example, the SIM 120 may have been in use for some time before the application 110 is used for the first time, the SIM 120 may have been handed between employees, the user may have forgotten which SIM is in which of their devices, etc.

Even when the user can discover the MSISDN, requiring the user to enter a long digit sequence manually is cumbersome and error-prone. To mitigate the latter, further checks can be carried out to verify that the user has entered the MSISDN correctly. For example, an SMS message containing a one-time-password (OTP) may be sent to the entered MSISDN, and the user may then enter that OTP into the application 110. This is also not particularly user-friendly in that it involves a relatively large amount of user interaction with the device 105.

Complexity relating to hidden MSISDNs could be pushed to the service provider and their administrators, for example by making a provisioning-time assignment of MSISDNs to users. In addition, the application 110 may guide the user through a series of questions to determine the type of the SIM 120 and, if this cannot be determined from provisioned information, to prompt the user to enter the MSISDN. For some deployment scenarios, this may be satisfactory. However, there are many other scenarios where it is not sufficient. It also does not provide ease-of-onboarding. In addition, it is inefficient use of resources if the service provider or business administrator needs to spend significant amounts of resources getting each individual end user up-and-running with the UC service.

In principle, the application 105 could query the OS 115 for the MSISDN. This is, however, unreliable in practice.

Some OSs (for example, iOS) may not allow third-party applications to query this information. As such, a different solution may be needed for such OSs.

In addition, some OSs (for example, iOS) allow applications from the OS developer to read information from incoming SMS messages, but do not, or may not, allow third-party applications to read such information. Third-party applications that are allowed to read information from incoming SMSs may require special permissions to do so. As such, mechanisms that require a third-party application to read information from one or more incoming SMS messages to verify the MSISDN may have limited applicability.

US 2018/0352417 A1, for example, describes automatically performing telephone number validation using SMS messages. However, in US 2018/0352417 A1, an incoming SMS message is required for such validation to be performed.

Although other OSs (for example, Android) offer application programming interfaces (APIs) to query SIM information, the MSISDN returned by the query is often incorrect. This is especially the case in environments where number portability occurs, such that an MSISDN is ported from one operator to another. This is because, in many mobile networks, the SIM 120 uses its IMSI when registering with the mobile network. The device 105 does not actually need to use the MSISDN to make and/or receive calls. Any MSISDN returned by the SIM 120 and OS 115 is typically a dummy number programmed at manufacturing time. Mechanisms exist to update the dummy number through over-the-air (OTA) updates, but they are not widely used in practice.

Some versions of Android allow applications to authenticate with the network using the SIM credentials. As part of the authentication process, such applications may be able to learn the MSISDN reliably. However, security restrictions implemented within Android mean that this option is only available when the SIM 120 and the application 110 are both provided by the same operator. The application 110 also needs to be granted special carrier privileges through certificate signing. This complicates distribution of the application 110.

Examples which will be described in more detail below allow an application and/or network equipment to determine a telephony identifier in a reliable manner. In these examples, the telephony identifier is an MSISDN associated with a SIM in a device. For example, a mobile SIM identity may be reliably associated with enhanced user services, such as UC services.

Figure 2:
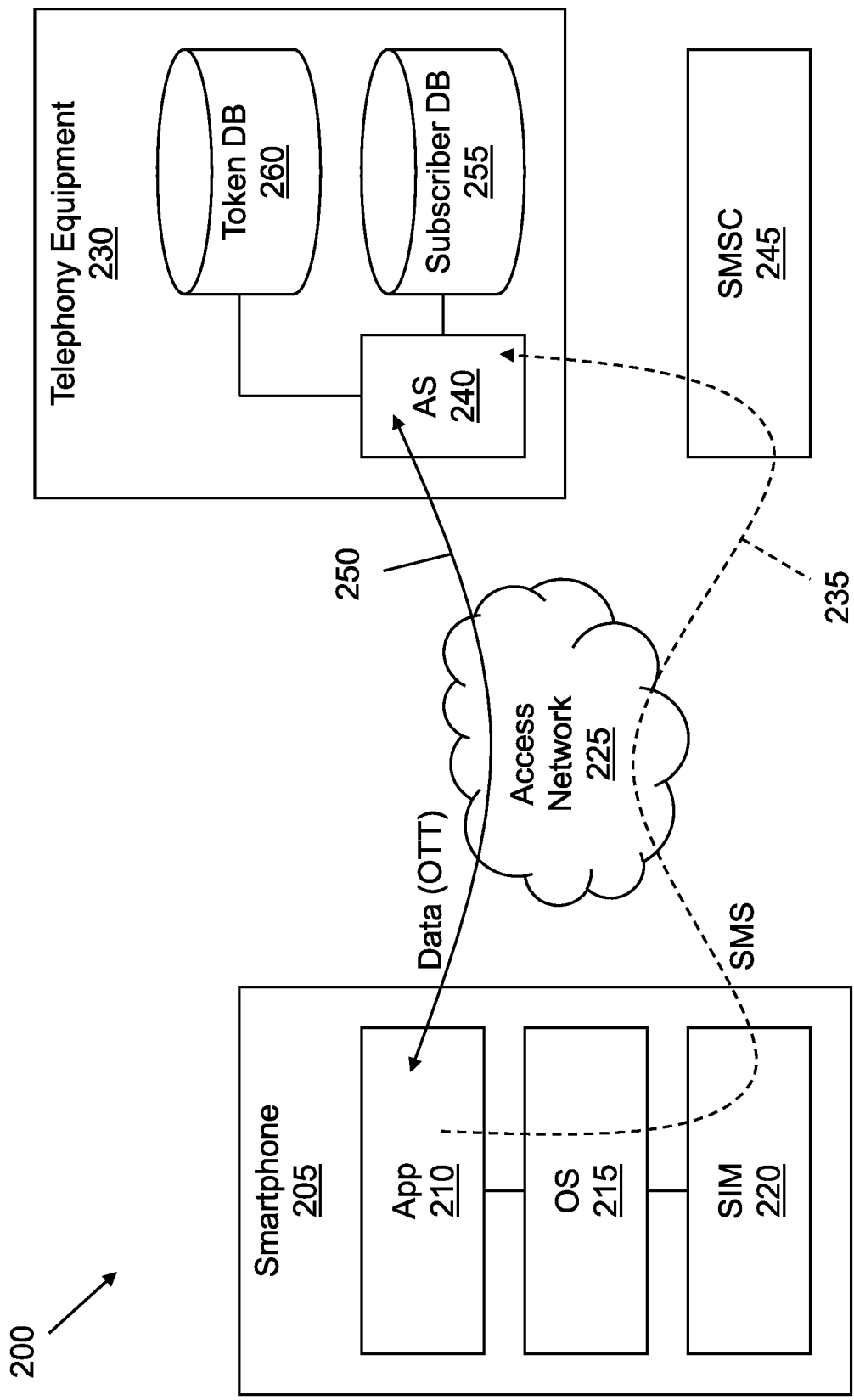
FIG. 2 shows a schematic block diagram representing another example of a network.

Referring to FIG. 2, there is shown an example of a network 200 in accordance with embodiments. UC services may be provided in the network 200.

The network 200 may be used to associate a user service with telephony identifier which, in this example, is an MSISDN. The term "user service" is used herein to mean a service available to a user of the device 205. In examples, the service comprises a telephony service. Where multiple different users use the device 205, the same or different user services may be available to the respective different users.

In this example, the device 205 comprises a smartphone with a (mobile) SIM card 220. The OS 215 may be Android or iOS. The device 205 is operable in the network 200 and is contactable via the MSISDN when operating in the network 200.

In this example, the application 210 is software running on the smartphone 205. In this example, the network equipment 230 comprises telephony equipment. In this example, the network equipment 230 comprises one or more server-side software components which have been developed by the same developer as the developer of the application 210 and which integrate into the telephony network of a mobile network operator that provides mobile telephony services to the user of the device 205.

As will be described in more detail below, a token is communicated between the application 210 and the AS 240 via a data path 250 (which may also be referred to as a "control channel") running over an OTT data network. In this example, the application 210 transmits the token to the AS 240 via the data path 250 and the token is referred to as a "transmitted" token. In other examples, the AS 240 receives the token from the application 210 via the data path 250. In both examples, the token is a "communicated" token. The OTT data network may use cellular data, WiFi data, etc. The data path 250 is represented by a solid line in FIG. 2.

The application 210 sends an SMS message to the server-side component(s), and in particular to an Application Server (AS) 240. The AS 240 may be a Telephony Application Server (TAS), an IP Multimedia Subsystem (IMS) AS, or may take a different form. The SMS message is transmitted via a network node 245, which in this example is a Short Message Service Centre (SMSC). An SMSC is a network node component of RTNs used for processing SMS messages.

The SMS message includes the sending MSISDN associated with the sending SIM 220 and the token received from the AS 240. If the transmitted and received tokens correlate (in other words, match with each other), the MSISDN can be associated with the device 205 and/or the user of the device 205. Associating the MSISDN with the device 205 may involve associating the MSISDN with the application 210. The AS 240 can send the MSISDN via the data path 250 such that application 210 can reliably learn the MSISDN.

As such, the MSISDN associated with the SIM 220 can be determined reliably, across different OSs (such as Android and iOS), and for SIMs which belong to the same operator as, or a different operator from, the operator providing enhanced telephony user services, such as UC. User experience is also improved because onboarding may be made fully automatic, or the user may simply be asked to confirm the sending of a single SMS message, which involves limited user interaction with the device 205.

In this example, the network equipment 230 comprises, or at least has access to, two distinct databases 255, 260. The network equipment 230 may comprise a different number of databases in other examples. The data stored in, and the structure of, the databases 255, 260 depends, for example, upon the use case. The databases 255, 260 may be physically separate, or may be co-located.

In this example, one database 255 is a subscriber database and will be referred to herein after accordingly. There may be more than one subscriber database 255 in other examples. In this example, the subscriber database 255 has persistent entries. Each subscriber record may be represented in the subscriber database 255 as a single row in a table. However, the subscriber database 255 may have a more complicated structure. For example, the subscriber database 255 may use a hierarchical object model, or a collection of tables in a relational database. A subscriber record may comprise user credentials (or "login credentials", or "account credentials"), in the form of a user identifier and a password. The user identifier may take the form of an email address or SIP URI, a primary telephone number, a universally unique identifier (UUID), etc. A subscriber record may comprise a display name, for example the name of the user. A subscriber record may comprise a service level and/or a service list (for example, "Premium Package"). A subscriber record may comprise a service configuration (for example, Do Not Disturb (DND) enabled). A subscriber record may comprise different information from that described by way of example above.

In this example, the other database 260 is a token database and will be referred to herein after accordingly. There may be more than one token database 260 in other examples. In this example, the token database 260 has temporary entries. In this example, entries in the token database 260 are deleted and/or expire after a predetermined time period. The token database 260 may take the form of a table with several columns. The token database 260 may include a 'Token' column, an entry in which may have an example form of 'hyEjd0926Ghc'. The token database 260 may include an 'Expiry Time' column, an entry in which may have an example form of '14:23:00'. The token database 260 may include an 'Application ID' and/or a 'Session ID' column, an entry in either of which may have an example form of 'ghgf097547v5'. The token database 260 may comprise different columns from those described by way of example above.

By having distinct subscriber and token databases 255, 260, each database may be individually optimised, for example based on the type of data it stores.

Figure 3A:
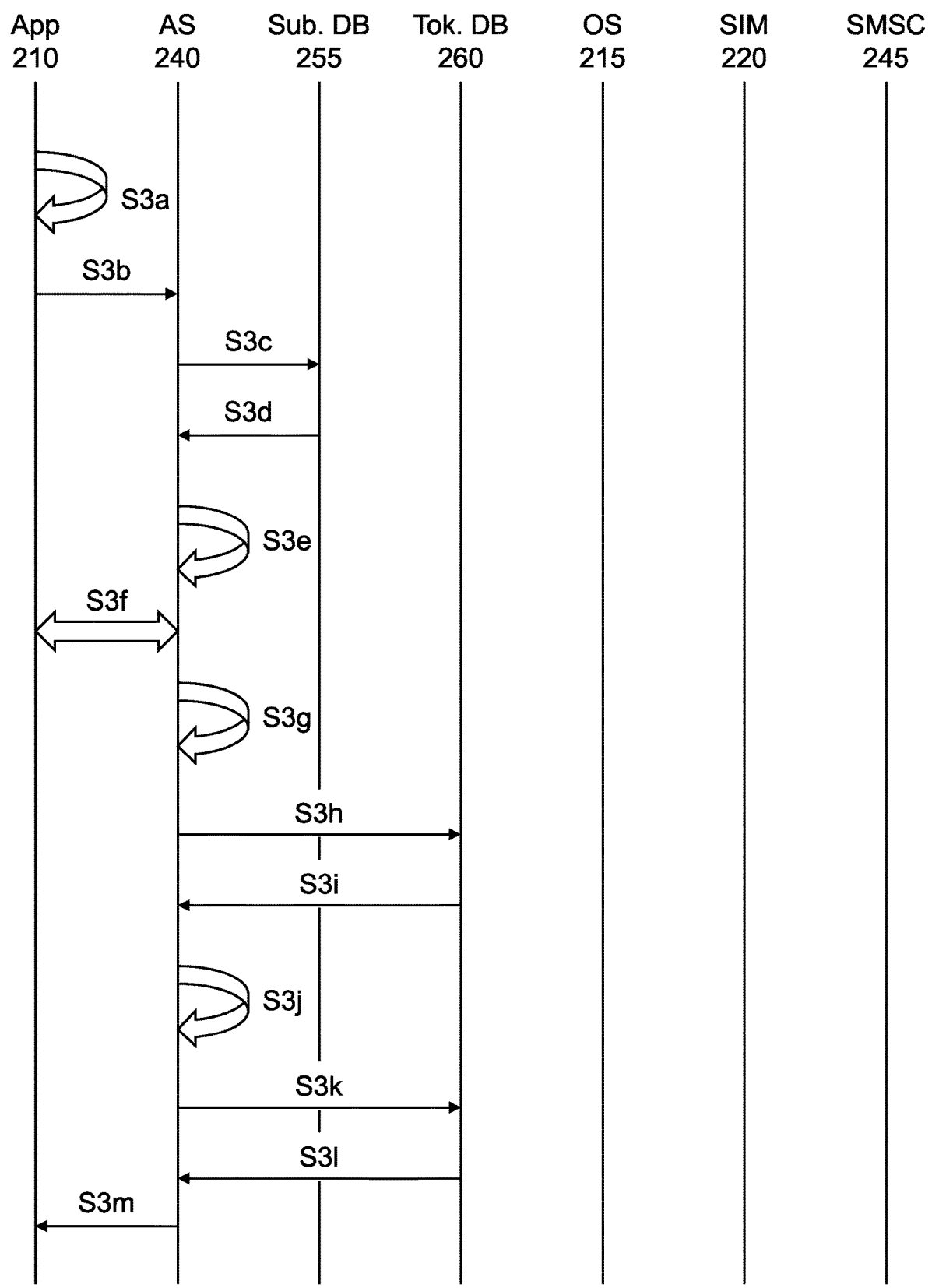
FIGS. 3A and 3B show a sequence diagram representing an example of a method of associating a user service with a telephony identifier.
Figure 3B:
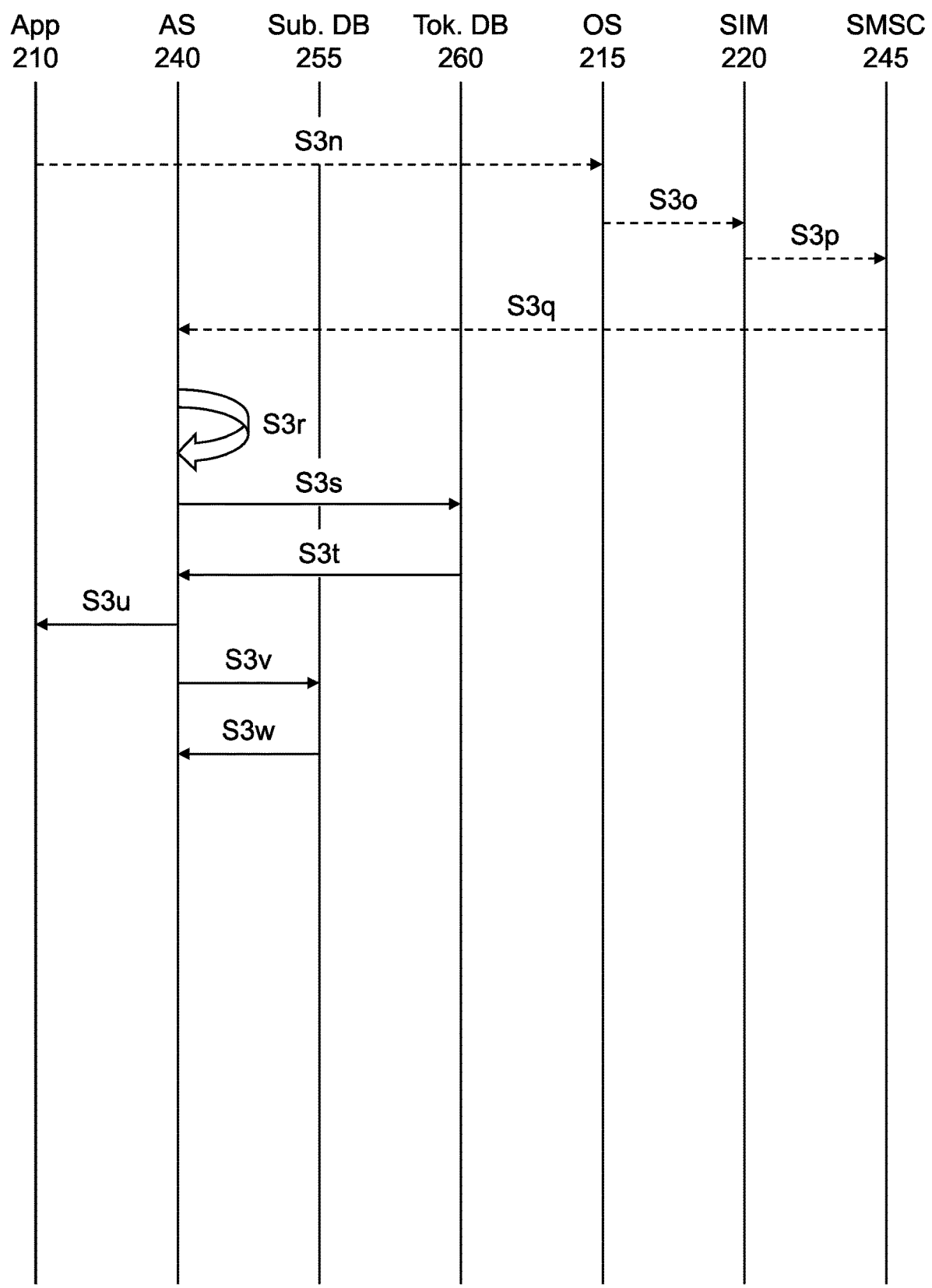

Referring to FIGS. 3A and 3B, there is shown an example of a method 300 of associating a user service with a telephony identifier. In this example, the telephony identifier comprises an MSISDN associated with a SIM of a device, but could be different in other examples. In this example, the method is performed in the network 200 described above with reference to FIG. 2. In this example, the user service comprises a telephony service. In this example, the telephony service includes call functions that enhance RTN-native voice calls.

The user accesses the user service via the application 210 on the device 205. In this example, the application 210 is a third-party application, in that it has been developed by a different developer from a developer of the OS 215. In this example, the device 205 is configured such that the application 210 does not have permission to access incoming SMS messages received by the device 205. Such configuration, in this example, is as a result of the OS 215 preventing the application 210 from accessing the information in such incoming SMS messages.

In this example, at item S3a, the user installs the application 210 onto their device 205. This may involve downloading the application 210 from an application store. In this example, the user launches the application 210 and enters user credentials. The user may be provided with instructions for this using an out-of-band mechanism, such as a welcome email, letter, etc. At item S3b, the application 210 logs into the AS 240 using the user credentials provided by the user. In this example, the user credentials comprise a user identifier and a password. At items S3c, S3d, and S3e, the AS 240 validates the user credentials using information stored in the subscriber database 255. Assuming that, at item S3e, the AS 240 positively validates the user credentials, the data path 250 between the application 210 and the AS 240 is established at item S3f. Establishing the data path 250 may therefore involve the application 210 authenticating itself using the user credentials provided by the user. The application 210 may authenticate itself in a different manner in other examples. Establishing the data path 250 may include use of a secure protocol. This can enable the data path 250 to be protected from eavesdropping and similar attacks. An example of a secure protocol is Hypertext Transfer Protocol Secure (HTTPS). Establishing the data path 250 may include other service initialisation steps. Examples of such other service initialisation steps include, but are not limited to, retrieving service configuration from the AS 240, prompting the user to change their password, etc. The retrieved service configuration may indicate a set of one or more call functions the user is permitted to use and/or one or more call functions the user is not permitted to use.

A different user may, at another time, enter different user credentials into the application 210 and access user services with which the different user is associated using the application 210. As such, different users may use the same application 210 to access their respective user services. This may be particularly effective where the device 205 is a shared device, used by multiple different users, for example in a family. A given user may also have access to multiple different sets of user services. For example, the user may have business credentials that allow them to access user services for business users and may have personal credentials that that allow them to access user services for personal users.

The application 210 may, at item S3b or otherwise, provide the AS 240 with an application identifier by which the application 210 uniquely identifies itself to the AS 240. The application identifier can take various different forms. For example, the application identifier may be in the form of a Media Access Control (MAC) address, International Mobile Equipment Identity (IMEI), a UUID, etc.

The AS 240 may, at item S3e or otherwise, create a session identifier for a session between the application 210 and the AS 240.

In this example, the onboarding process then proceeds at items S3g to S3m, in which a token is communicated between the AS 240 and the application 210 via the data path 250. The AS 240 may later associate the token with the specific instance of the application 210. In this example, the AS 240 chooses the token and transmits the token to the application 210 via the data path 250. However, in other examples, the application 210 may generate the token and transmit the token to the AS 240 via the data path 250.

In this example, the AS 240 maintains a list of active tokens objects. The list may be maintained, for example, in memory. In this example, the active token list is maintained in the token database 260.

In this example, at item S3g, the AS 240 creates a candidate token. In this example, the AS 240 creates a candidate token by generating a random alphanumeric string. In this example, at items S3h, S3i, and S3j, the AS 240 checks for uniqueness amongst active tokens in the token database 260. If a clash is found, items S3g, S3h, S3i and S3j are repeated until a unique value is found.

In this example, it is assumed that, at S3j, the AS 240 finds a unique token. In this example, at items S3k and S3l, the AS 240 adds the chosen token to the list of active tokens in the token database 260. The AS 240 may add additional information, used in later stages, to the token database 260 in association with the token. Examples of such additional information include, but are not limited to, timestamp, user identifier, account identifier, control channel identifier, application instance identifier, etc. In this specific example, at S3k, the AS 240 adds a new row to the token database 260, which includes the chosen token, a timestamp, an application identifier and a session identifier. In this specific example, the timestamp is set as thirty seconds after the new row is added to the token database 260. However, other time periods may be used.

In this example, at item S3m, the AS 240 transmits, to the application 210 on the device 205, first data comprising the chosen token. In this example, the AS 240 sends the first data to the application 210 via the OTT data path 250 using one or more messages. The first data may comprise additional information to assist the AS 240 with later processing. The additional information may be within and/or alongside the chosen token in the first data. Such additional information may comprise a user identifier, a server identifier, a token sequence number, etc. The server identifier may identify the AS 240. The first data may also comprise data indicative of a service telephone number for the device 205 to use for an RTN-native service, which will be described in more detail below.

As such, the AS 240 has received a request from the application 210 to establish a secure connection to form the OTT data path 250 and has transmitted the first data to the application 210 on the device 205 via the established secure connection. Further, the application 210 has received the token transmitted by the AS 240 via the data path 250 and not in an incoming SMS message. The application 210 can therefore reliably receive the token even though the application 210 is unable to receive incoming SMS messages received by the device 205. In addition, the AS 240 has generated and transmitted the token to the application 210 without any knowledge of, and prior to receiving, the MSISDN.

In this example, at items S3n, S3o, S3p, and S3q, the application 210 causes second data to be transmitted to the AS 240 via an RTN-native service. RTN-native services may be services provided natively by the network operator that allocated the MSISDN. Such services may use a native application on the device 205, such as a native dialler application and/or a native messaging application. The MSISDN may be signalled in control signalling associated with RTN-native services. In this example, the second data comprises the token received by the application 210 via the data path 250. In this example, the RTN-native service is SMS and the application 210 causes an SMS message to be sent to the service number previously communicated by the AS 240 in the first data. As such, the service number may be dynamically generated by the AS 240 and sent to the application 210 via the data path 250. The service number may alternatively or additionally be preconfigured into the application 210. The service number may alternatively or additionally be learned from service configuration initially received from the AS 240. The token is included within the body of the SMS message. Some mobile OSs (for example, iOS) may prompt the user to confirm that the application 210 is permitted to send the SMS message. In such cases, the user accepts this request to send the SMS message. In this example, at item S3q, the AS 240 receives the SMS message via the network 200. The MSISDN will have been added to the SMS message by the network 200. In particular, in this example, at item S3p, the device 205 sends the SMS message to the SMSC 245. In this example, at item S3p, the SMSC 245 forwards the message to the AS 240, for example using the Short Message Peer-to-Peer (SMPP) protocol.

As such, the AS 240 has received, from the device 205, second data comprising a received token. The AS 240 receives the second data from the device 205 via an RTN-native service which, in this example, is SMS. The AS 240 has received the MSISDN in control signalling associated with the RTN-native service (in this example, SMS). The AS 240 has received the MSISDN from a network node 245 in the network 200. In this example, the network node comprises the SMSC 245.

In this example, at item S3r, the AS 240 extracts the received token and the MSISDN.

In this example, at items S3s and S3t, the AS 240 uses the received token to identify the user and/or instance of the application 210, and then associates the received token with the MSISDN. In this example, at item S3s, the AS 240 searches the active token list in the token database 260 for the received token and, at item S3t, retrieves any additional information stored in association with the received token. The AS 240 may perform one or more additional validity checks at this point. For example, the AS 240 may check that the SMS message has been received in a timely manner. This may involve the AS 240 using timestamp information stored as the additional information in the token database 260. The AS 240 may delete the token from the active list, for example by deleting the row associated with the token from the token database 260. The AS 240 may alternatively take other action to mark the token as invalid and/or to age it out. This can help prevent immediate token reuse, which could otherwise present a security risk. As such, in this example, the AS 240 queries the token database 260 for the token received at item S3q, checks that the token has not expired, and retrieves the application identifier and/or session identifier. The AS 240 may delete the row having the token at this point.

Since the AS 240 had stored the transmitted token in the token database 260 and since the AS 240 found a match in the token database 260 when searching for the received token, the AS 240 has correlated the received token with the transmitted token. As such, based at least on correlating the received token with the transmitted token, the AS 240 has associated the received MSISDN with the user service. Further, in this example, the AS 240 has associated an expiry time with the transmitted token and the associating of the received MSISDN with the user service is based further on the expiry time not having expired.

In this example, at item S3u, using the additional information retrieved from the token database 260, the AS 240 sends the application 210 a message via the data path 250. For example, the AS 240 may use the session identifier to notify the application 210 of the MSISDN received at item S3q. As such, the AS 240 has transmitted the received MSISDN to the application 210 on the device 205 via the OTT data path 250. Further, the AS 240 has previously associated the transmitted token with data identifying the device 205 and/or the user, and the MSISDN is transmitted to the application 210 on the device 205 via the OTT data path 250 using the data identifying the device 205 and/or the user.

In this example, at items S3v and S3w, the AS 240 additionally updates the subscriber database 255 with details of the MSISDN. For example, the AS 240 may add the MSISDN to an existing subscriber record for the user. If the subscriber record is implemented as a set of tables in a relational database, then the AS 240 may add a row into a table, with a user identifier column and an MSISDN column. The row may also have an application identifier column.

Having now automatically and reliability determined the MSISDN, additional actions may be taken to further improve the onboarding experience for the user and the operator.

In some examples, the application 210 and/or AS 240 performs number range analysis on the MSISDN. This can enable the application 210 and/or AS 240 to determine that the MSISDN is from a particular country. It may also be determined whether the SIM 220 is an "on-net" or "off-net" SIM 220, based upon whether the MSISDN is owned by the same operator as the operator providing the enhanced services and whether the MSISDN has a particular Home Location Register (HLR) or Home Subscriber Server (HSS) configuration.

In some examples, the application 210 and/or the AS 240 determines which call functions can be offered to the end user with this SIM 220. This allows the application 210 to hide unavailable options. Service determination may be based on number range analysis of the MSISDN or otherwise. In this example, the AS 240 determines, based on the received MSISDN, a set of one or more call functions that are to be provided in accordance with the user service and/or one or more call functions that are not to be provided in accordance with the user service. In this example, the AS 240 transmits data indicative of the set of one or more call functions to the application 210 on the device 205 via the OTT data path 250.

In some examples, the application 210 and/or the AS 240 checks whether the MSISDN is already present in a subscriber database 255. In such examples, it may be determined whether the MSISDN is already associated with another user, another instance of the application 210, etc. This may be the case where the subscriber database 255 already has an entry for the MSISDN, but in association with a different user identifier. If so, it may be determined whether that other user is associated with the same business. This may identify scenarios where the SIM 220 has been legitimately handed between employees. In such a scenario, the account settings of the original employee can be updated. This may also identify potentially fraudulent activity for further investigation. As such, the AS 240 can determine that the received MSISDN is already associated with a different instance of the application 210, and, in response to that determination, can perform a predetermined action. Examples of such predetermined action include, but are not limited to, triggering an alert, such that remedial action can be taken.

In some examples, the application 210 and/or the AS 240 initiates an automated provisioning flow. This may involve updating a repository, such as an HSS/HLR, so that subsequent calls to and/or from the MSISDN are routed via the AS 240. This can be particularly effective for UC operators, since the UC operator can distribute standard "consumer" SIMs to businesses for their employees, and since the employee can self-enable UC services themselves without needing administrator assistance. As explained above, other self-provisioning techniques rely upon the user knowing the MSISDN. As such, the AS 240 can data indicative of an association between the AS 240 and the MSISDN to be stored in a network repository to enable voice calls using the MSISDN to be routed to the AS 240.

Although, in this example, the AS 240 stores an association between the MSISDN and the device 205, application 210 and/or user of the device 205, the MSISDN may or may not be signalled to other users. For example, an outgoing call from the device 205 may be routed to the AS 240, and the AS 240 may withhold the MSISDN in outgoing signalling or may replace the MSISDN with another telephony identifier. The other telephony identifier may, for example, be a landline telephone number of a business of which the user is an employee. As such, the user could make a business call from their device 205 (for example, a mobile telephone) and, through identity services provided by the AS 240, have the call appear to be from a different telephone number (for example, the business landline number).

The AS 240 can use the user service to apply a call function to a voice call that is identified using the MSISDN. The voice call may be an incoming call or an outgoing call with respect to the device 205. The call function may comprise uplifting the voice call into a collaborative meeting session. The user may be a multi-device user and the call function may comprise moving the voice call between the device 205 and another device of the user.

The above embodiments are to be understood as illustrative examples. Further embodiments are envisaged.

In examples described above, the device 205 sends an SMS message with the token and the MSISDN. Other (SIM-based) RTN-native services capable of signalling the token and the MSISDN could be used instead of, or as well, as an SMS message. Examples of other such RTN-native services include, but are not limited to, Unstructured Supplementary Service Data (USSD), Multimedia Messaging Service (MMS), Rich Communication Services (RCS), RTN-native voice calls with the token being signalled using Dual-tone Multi-frequency (DTMF) digits, etc.

In examples described above, the AS 240 generates the token non-deterministically such that the token may be said to have been generated randomly. Alternative techniques for choosing a token may, however, be used. For example, a session identifier associated with the data path 250 may be used, an application unique identifier (for example, a UUID) may be used, etc. Having regard to security considerations, the token should be difficult for another party to guess (for example, to prevent hijacking attempts) and the token should not be used for any broader purpose, since SMS messages might be sent in the clear.

In examples described above, the AS 240 both sends the message at item S3$u$ and updates the subscriber database 255 at items S3$v$ and S3$w$. In other examples, the AS 240 either sends the message at item S3$u$ or updates the subscriber database 255 at items S3$v$ and S3$w$ (both not both). In other examples, the AS 240 neither sends the message at item S3$u$ nor updates the subscriber database 255 at items S3$v$ and S3$w$.

In examples described above, the user enters user credentials into the application 210 at item S3$a$ and the application 210 provides the user credentials to the AS 240 at item S3$b$. In some examples, a user does not need to provide any user credentials to use the user service described herein. For example, any person using the application 210 may be able to make use of a user service via the application 210, where the user service has been associated with the MSISDN.

In examples described above, the AS 240 receives, from the SMSC 245 in the network 200, the MSISDN in control signalling associated with an SMS message. In other examples, the AS 240 receives the MSISDN in control signalling associated with a different RTN-native service and/or from a different network node in the network. For example, where the RTN-native service comprises USSD, the network node 245 may comprise a USSD gateway. Where the RTN-native service comprises MMS, the network node 245 may comprise a Multimedia Messaging Service Centre (MMSC). Where the RTN-native service comprises RCS, the network node 245 may comprise an RCS AS.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of associating a user service with a Mobile Station ISDN Number (MSISDN), the user service accessible by a telephony device via an application on the telephony device, the telephony device configured to communicate in a radio telephony network (RTN) and identifiable via the MSISDN when operating in the RTN, the method comprising:
sending, by an application server providing the user service, a token usable to uniquely identify the application on the telephony device, wherein the user service is remotely provided to the telephony device;
receiving, by the application server from the application on the telephony device via an RTN-native service over the RTN, the token that was previously sent to the application by the application server;
receiving, from a network node in the RTN, the MSISDN of the telephony device, the MSISDN determined based on control signaling associated with the RTN-native service when the token is being sent from the telephony device to the application server over the RTN; and
based on the application server determining that the token received from the telephony device via the RTN-native service matches the token that was sent by the application server to the telephony device, associating the received MSISDN with the user service to enable the user service to provide services to the telephony device based on the MSISDN, wherein the application on the telephony device does not have permission to directly access the MSISDN and provide the MSISDN to the application server, and wherein the control signaling associated with the RTN-native service enables the MSISDN to be determined and provided to the application server by the network node in the RTN without directly receiving the MSISDN from the telephony device.

2. The method of claim 1, further comprising using the user service to apply a call function to a voice call that is identified using the MSISDN.

3. The method of claim 2, wherein the call function is configured to uplift the voice call into a collaborative meeting session.

4. The method of claim 2, wherein the call function is configured to move the voice call between the telephony device and another device.

5. The method of claim 1, further comprising causing data indicative of an association between the application server and the MSISDN to be stored in a network repository to enable voice calls using the MSISDN to be routed to the application server.

6. The method of claim 1, further comprising associating an expiry time with the token, wherein said associating is based further on the expiry time not having expired.

7. The method of claim 1, wherein the token is communicated via an Over-the-Top (OTT) data path established between the application server and the application on the telephony device.

8. The method of claim 7, further comprising receiving a request from the application to establish a secure connection to form the OTT data path, wherein the token is communicated between the application server and the application on the telephony device via the established secure connection.

9. The method of claim 7, further comprising transmitting the received MSISDN to the application on the telephony device via the OTT data path.

10. The method of claim 7, further comprising associating the token with data identifying the telephony device, wherein the MSISDN is communicated between the application server and the application on the telephony device via the OTT data path using the data identifying the telephony device.

11. The method of claim 7, further comprising transmitting, via the OTT data path, data indicative of a service telephone number for the telephony device to use for the RTN-native service.

12. The method of claim 7, further comprising:
determining, based on the received MSISDN, a set of one or more call functions that are to be provided in accordance with the user service or that are not to be provided in accordance with the user service; and
transmitting data indicative of the set of one or more call functions to the application on the telephony device via the OTT data path.

13. The method of claim 1, wherein the application server comprises a telephony application server (TAS) or an IMS application server (AS).

14. The method of claim 1, wherein the RTN-native service comprises one of:
SMS;
Unstructured Supplementary Service Data (USSD);
Multimedia Messaging Service (MMS);
Rich Communication Services (RCS); or
an RTN-native voice call.

15. The method of claim 1, further comprising:
determining that the received MSISDN is already associated with a different instance of the application; and
in response thereto, performing a predetermined action.

16. A method of enabling a user service accessible by a telephony device via an application on the telephony device, the telephony device associated with a Mobile Station ISDN Number (MSISDN), the telephony device configured to communicate in a radio telephony network (RTN) and identifiable via the MSISDN when operating in the RTN, the method comprising:
receiving, from an application server providing the user service, a token usable to uniquely identify the application on the telephony device, wherein the user service is remotely provided to the telephony device; and
transmitting, by the telephony device, second data comprising the token that was previously sent to the application by the application server, wherein the second data is transmitted from the telephony device via an RTN-native service, wherein the token is usable by the application server to determine that the token received from the telephony device via the RTN-native service matches the token that was sent by the application server to the telephony device, thereby enabling the application server to associate the MSISDN with the user service to enable the user service to provide services based on the MSISDN, wherein the MSISDN is provided to the application server from an RTN node and determined by the RTN node based on control signaling associated with the RTN-native service when the token is being sent from the telephony device to the application server over the RTN;

wherein the application on the telephony device does not have permission to directly access the MSISDN and provide the MSISDN to the application server.

17. A system for associating a user service accessible by a telephony device via an application on the telephony device with a MSISDN, the telephony device configured to communicate in a radio telephony network (RTN) and identifiable via the MSISDN when operating in the RTN, the system comprising a processor and memory, the memory storing thereon computer-executable instructions that, when executed by the processor, cause the system to perform operations comprising:

sending a token to the application on the telephony device, the token usable to uniquely identify the application on the telephony device;

receiving, from the application on the telephony device via an RTN-native service, the token that was previously sent to the application;

receiving, from a network node in the RTN, the MSISDN of the telephony device, the MSISDN determined based on control signaling associated with the RTN-native service when the token is being sent from the telephony device; and in response to determining that the token received from the telephony device via the RTN-native service matches the token that was sent to the telephony device, associating the received MSISDN with the user service to enable the user service to provide services to the telephony device based on the MSISDN, wherein the application on the telephony device does not have permission to directly access the MSISDN and provide the MSISDN, and wherein the control signaling associated with the RTN-native service enables the MSISDN to be determined and provided by the network node in the RTN without directly receiving the MSISDN from the telephony device.

* * * * *